US009501346B2

(12) United States Patent
Hanckel et al.

(10) Patent No.: US 9,501,346 B2
(45) Date of Patent: Nov. 22, 2016

(54) FINE AND COARSE GRANULARITY LOGGING HANDLER

(71) Applicant: ORACLE INTERNATIONAL CORPORATION, Redwood Shores, CA (US)

(72) Inventors: Robert Hanckel, Amherst, NH (US); Parthiban Thilagar, Hollis, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 373 days.

(21) Appl. No.: 14/159,625

(22) Filed: Jan. 21, 2014

(65) Prior Publication Data

US 2015/0205696 A1    Jul. 23, 2015

(51) Int. Cl.
*G06F 11/07*    (2006.01)
*G06F 11/34*    (2006.01)

(52) U.S. Cl.
CPC ....... *G06F 11/0787* (2013.01); *G06F 11/0709* (2013.01); *G06F 11/0778* (2013.01); *G06F 11/0781* (2013.01); *G06F 11/0784* (2013.01); *G06F 11/3476* (2013.01)

(58) Field of Classification Search
CPC .................................. G06F 11/0766–11/0787
See application file for complete search history.

(56) References Cited

U.S. PATENT DOCUMENTS

| | | | | |
|---|---|---|---|---|
| 5,428,766 A * | 6/1995 | Seaman | ............... | G06F 11/0751 709/215 |
| 6,986,076 B1 * | 1/2006 | Smith | .................. | G06F 11/004 714/4.11 |
| 7,111,206 B1 * | 9/2006 | Shafer | ................. | H04L 41/0266 714/20 |
| 8,621,285 B2 | 12/2013 | Thilagar et al. | | |
| 2005/0171731 A1 * | 8/2005 | Chen | ..................... | G06F 9/4425 702/176 |
| 2006/0020634 A1 * | 1/2006 | Huras | ............... | G06F 17/30368 |
| 2006/0095478 A1 * | 5/2006 | Cherkauer | .......... | G06F 11/1662 |
| 2007/0100910 A1 * | 5/2007 | Gole | .................. | G06F 11/1471 |
| 2011/0078515 A1 * | 3/2011 | Yasukawa | ........... | G06F 11/0775 714/48 |
| 2011/0085194 A1 * | 4/2011 | Asari | ..................... | G03G 21/02 358/1.14 |
| 2011/0167048 A1 * | 7/2011 | Xiu | ..................... | G06F 11/3476 707/687 |
| 2013/0303154 A1 * | 11/2013 | Gupta | ..................... | G06F 21/56 455/423 |
| 2014/0237454 A1 * | 8/2014 | Delporte | ............. | G06F 11/3636 717/128 |
| 2015/0186240 A1 * | 7/2015 | Kegel | ................. | G06F 11/3065 710/18 |

* cited by examiner

*Primary Examiner* — Gabriel Chu
*Assistant Examiner* — Paul Contino
(74) *Attorney, Agent, or Firm* — Kraguljac Law Group, LLC (57) ABSTRACT

Systems, methods, and other embodiments associated with intelligently gathering log messages are described. In one embodiment, a computer-implemented method includes collecting, by a logging handler associated with a component, log messages according to two different granularities for logging messages. The two different granularities include a fine granularity and a coarse granularity. Collecting the log messages according to the fine granularity includes storing log messages in an incident buffer. The method includes, in response to detecting an error at the component, (i) freezing the incident buffer to preserve log messages present in the incident buffer, and (ii) communicating log messages that are collected according to the coarse granularity that are stored in a regular buffer to a logging appliance.

19 Claims, 9 Drawing Sheets

FINE AND COARSE GRANULARITY LOGGING HANDLER

BACKGROUND

Logs are used for understanding what went wrong with a computing system when errors or other fault conditions occur. Typical logging behavior includes writing a log message to a local text file immediately after an event occurs in a component (e.g., an application). Logs for components in an application cluster are used for understanding a failure in the application cluster. In general, a logging appliance gathers logs from many logging handlers distributed throughout the application cluster to simplify and formalize organization of all logs. Whether the gathering of logs is done by a logging appliance, or manually, often times support personnel are faced with a lack of detail about what failed components were doing when a problem first occurred. This is because the logs that are gathered are, generally, logs that only provide coarse information.

Consider that some logging handlers, which collect log messages locally from components, may collect log messages at different levels of detail. For example, fine-grain detailed logging is resource expensive because a volume and a rate of logging is dramatically higher than course grain logging, where logging generally occurs for fewer events such as warnings or severe errors. Fine grain logging can exceed course grain logging by many orders of magnitude in resource consumption.

Thus, administrators of an application cluster inevitably must decide what level of logging is acceptable. Tradeoffs between coarse logging with better performance and fine logging with better manageability must be made and, typically, manageability loses out. Accordingly, when an application cluster does fail, the lack of detail from coarse logging often makes understanding the failure difficult.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein associated with intelligently gathering log messages. Consider that to avoid consuming a large amount of resources log messages are, in general, collected at a coarse level and not a fine level of granularity. That is, for example, only severe log messages (e.g., severe errors and warnings) are collected by logging handlers and then gathered by a logging appliance from each logging handler. In this way, resources are more efficiently utilized.

However, coarse logging alone fails to provide enough information for effectively diagnosing many errors. Thus, in one embodiment, logging handlers and a logging appliance are discussed herein that intelligently gather log messages. That is, for example, a logging handler collects log messages at a fine granularity and a coarse granularity but saves a limited amount of log messages from the fine granularity. Accordingly, in one embodiment, the logging handler continually recycles resources allocated to fine granularity logging by replacing old log messages with new log messages.

Additionally, the log messages collected at the fine granularity are, in general, gathered and saved by the logging appliance, for example, only when an error occurs. That is, the logging appliance may only collect log messages of a fine granularity for logging handlers that are involved with an error. Accordingly, the logging appliance is not wasting resources by gathering detailed log messages from all handlers continuously as in traditional fine grain logging. In this way, the logging handlers and the logging appliance may work together to intelligently gather log messages. That is, to intelligently gather log messages is to avoid gathering excessive amounts of irrelevant log messages and instead to gather detailed log messages from relevant sources in response to qualifying events.

Figure 5:
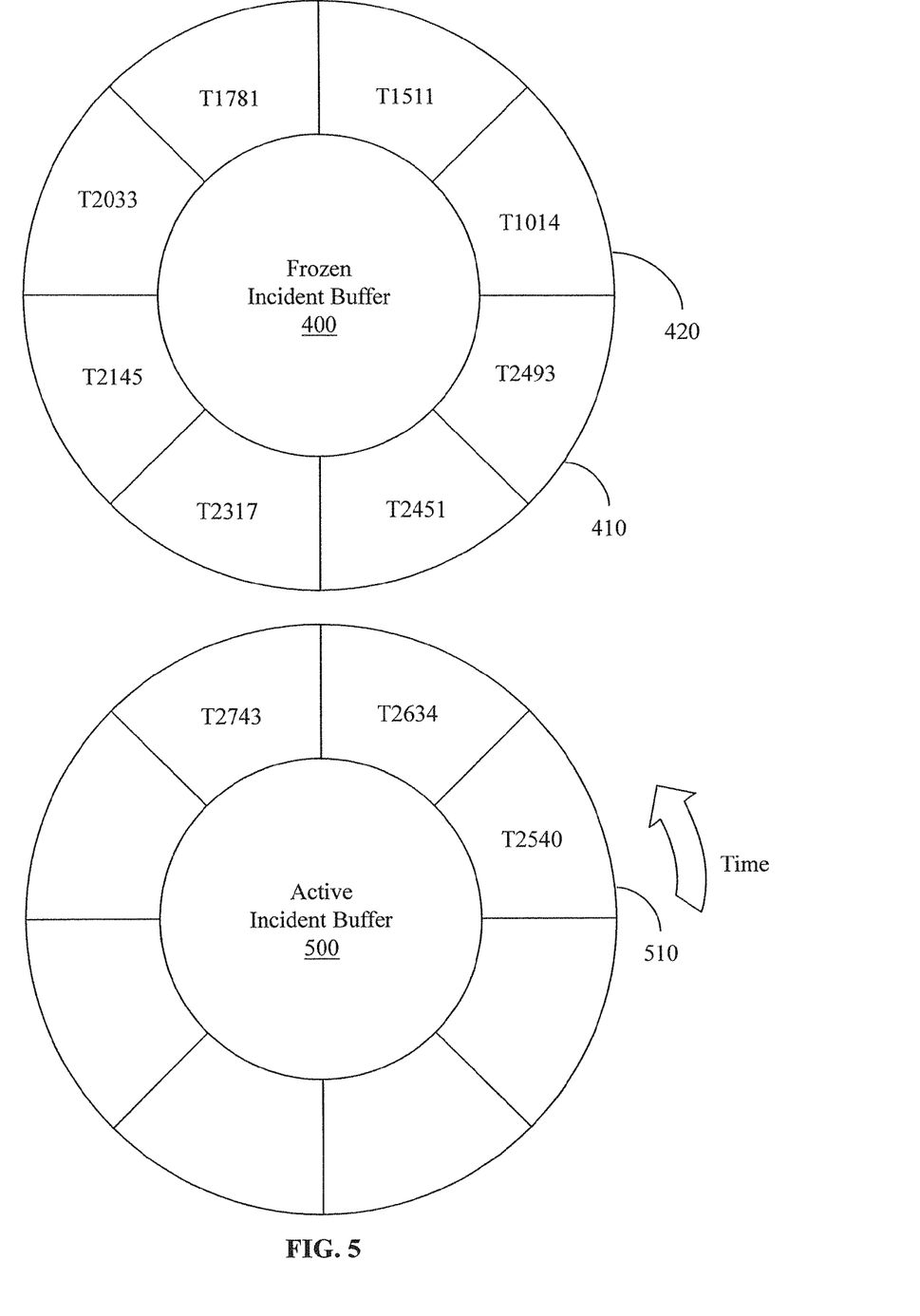
FIG. 5 illustrates one embodiment of swapping incident buffers.
Figure 6:
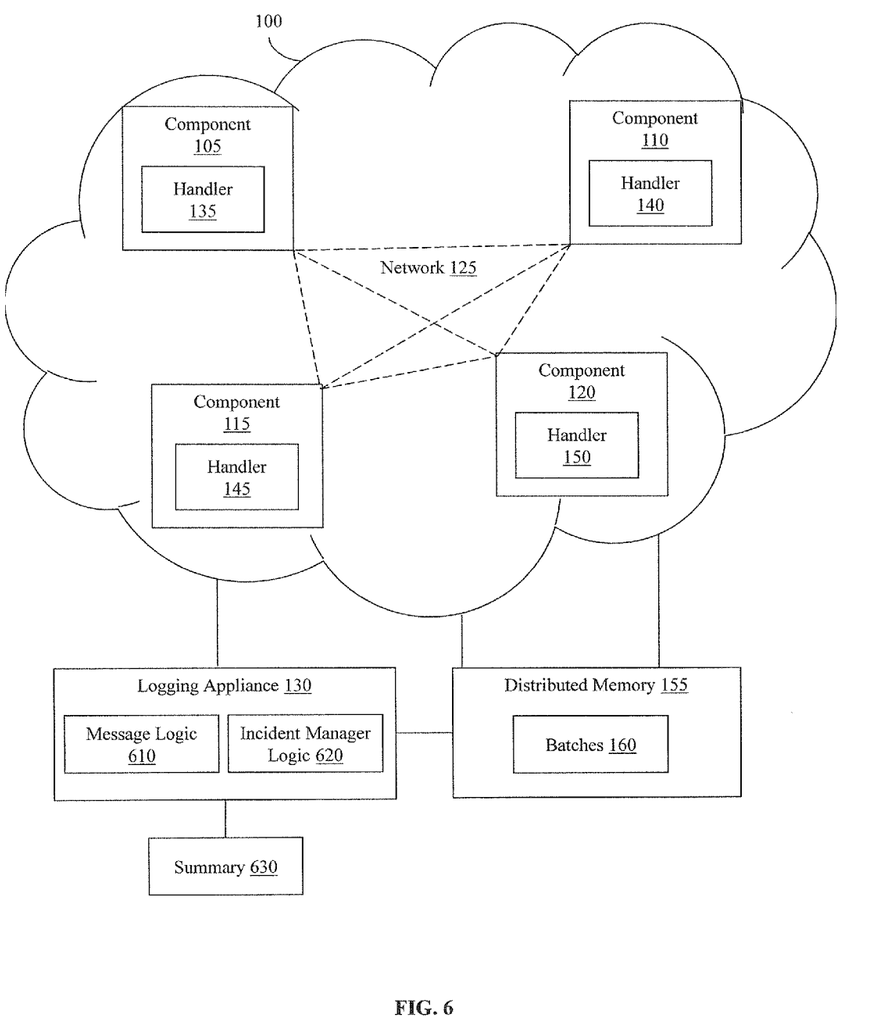
FIG. 6 illustrates one embodiment of a logging appliance associated with intelligently gathering log messages.
Figure 7:
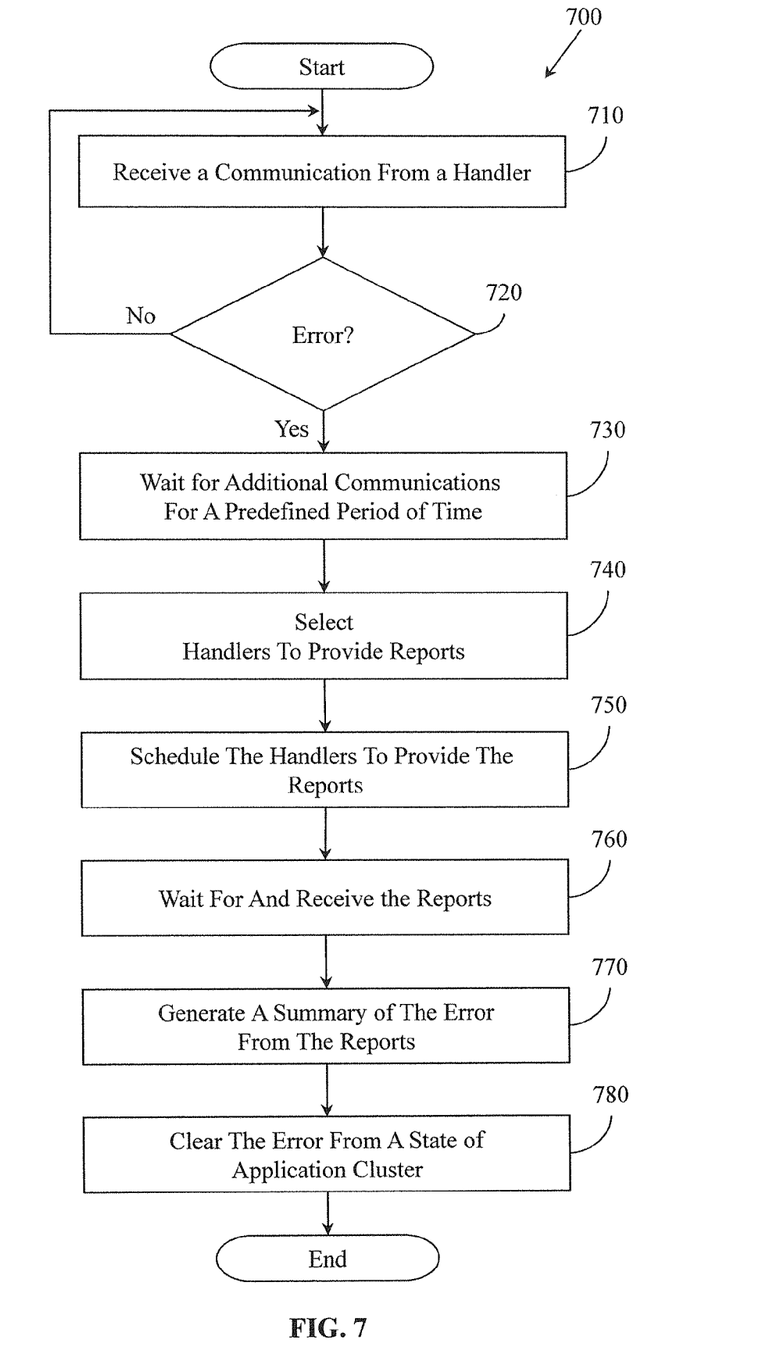
FIG. 7 illustrates an embodiment of a method associated with intelligently gathering log messages by a logging appliance.
Figure 8:
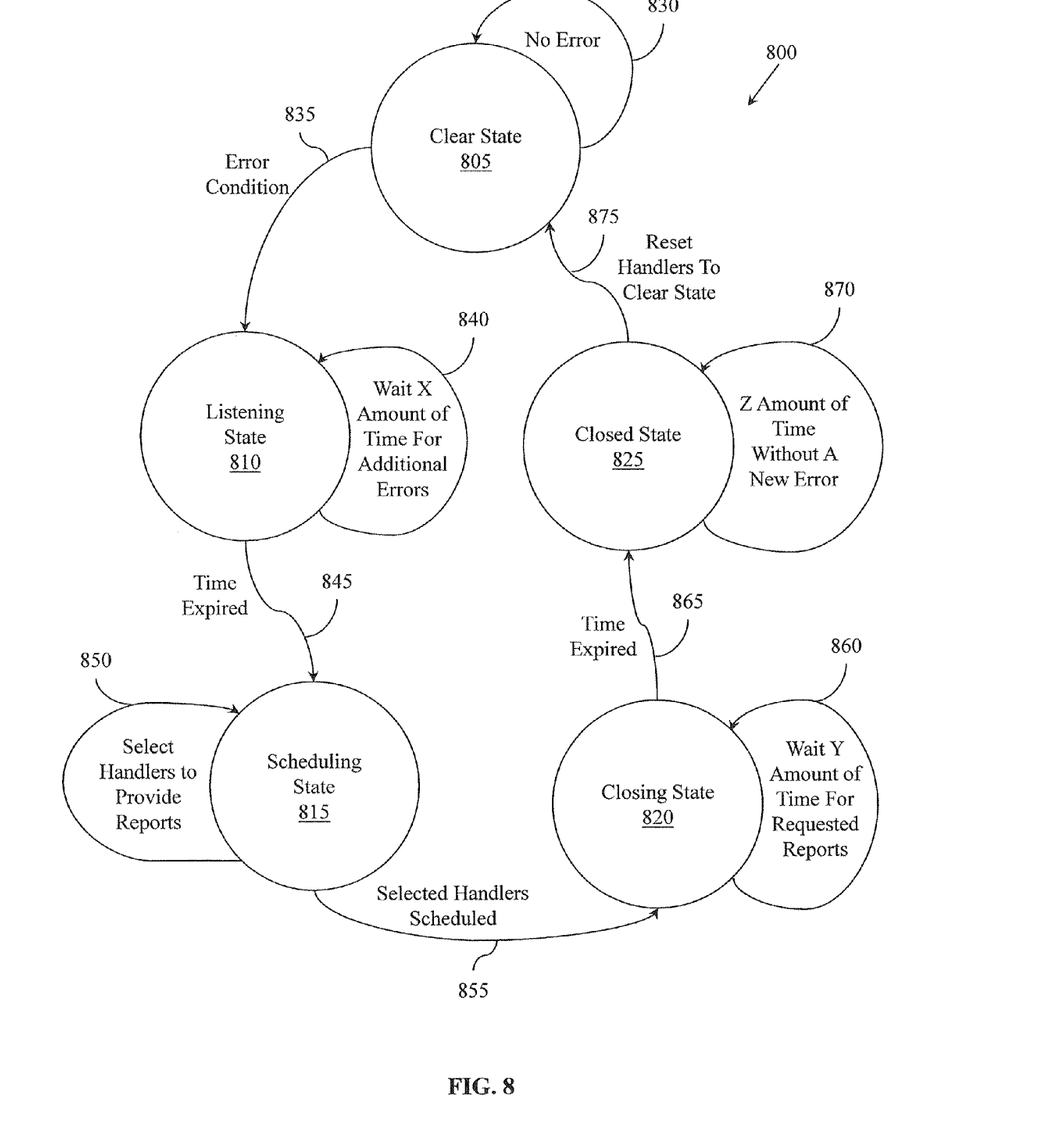
FIG. 8 illustrates one embodiment of a state diagram associated with an application cluster.

This disclosure first includes a general discussion of a computing environment (FIG. 1) followed by discussion of one embodiment of a logging handler (FIGS. 2-5) and, subsequently, a discussion of one embodiment of a logging appliance (FIGS. 6-8).

Computing Environment

Figure 1:
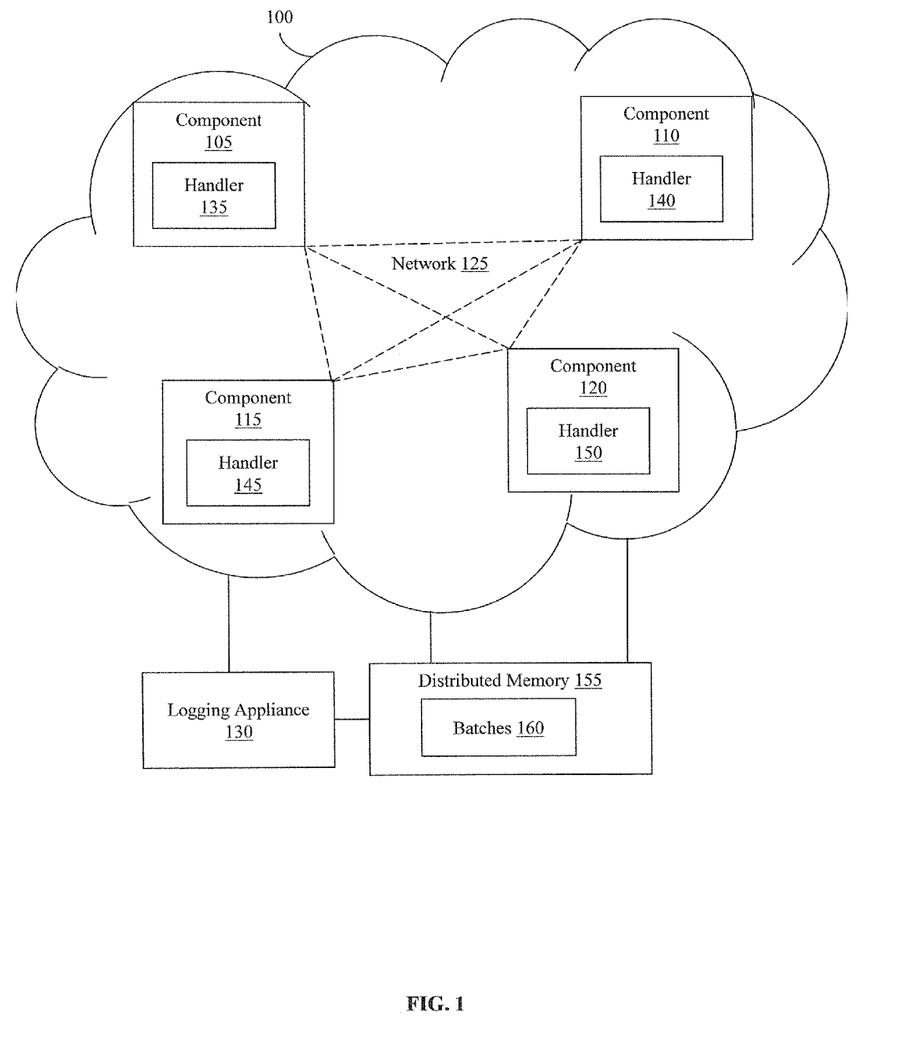
FIG. 1 illustrates one embodiment of a system associated with intelligently gathering log messages.

With reference to FIG. 1, consider a computing environment of an application cluster 100. The application cluster 100 is, for example, a computing grid that is composed of a plurality of components spread across different host devices. In one embodiment, the application cluster 100 is a cloud computing environment. In FIG. 1, the application cluster 100 includes components 105, 110, 115, and 120 (hereinafter collectively referred to as components 105-120). The components 105-120 may each reside within a different host device (not illustrated), or may co-exist in various combinations among one or more host devices. However, for purposes of this disclosure each of the components 105-120 will be discussed as residing in different host devices distributed within a network 125.

In general, the components 105-120 are, for example, a set of processes that are loosely related but together execute in parallel to perform one or more computing tasks. Additionally, the hosts are, for example, computing devices on which one or more components operate to execute processes in the application cluster 100. In one embodiment, each of the plurality of hosts is a server or other computing device that is configured to execute one or more processes (i.e., components).

Further consider that the plurality of hosts and the plurality of components (e.g., 105-120) in the application cluster 100 are dynamic in that hosts that include additional components may be added or removed from the application cluster 100 on-the-fly during operation. In this way, the application cluster 100 is scalable to dynamically account for changes in a processing load.

Furthermore, the components 105-120 are remote from one another and are distributed within the network 125 among the plurality of hosts. Thus, the network 125 carries communications between the components 105-120, between the components 105-120 and a logging appliance 130 and/or between the components 105-120 and an associated distributed memory 155. In some embodiments, the network 125 is the Internet, a local area network (LAN), a wide area network (WAN), a wireless network, a cellular network, combinations of various types of networks, and so on.

Consider that each of the components 105-120 is susceptible to failure, errors, or other conditions and also, for example, generates other events that are to be logged. Accordingly, along with each of the components 105-120 is a respective logging handler 135, 140, 145, and 150 (hereinafter collectively referred to as handlers 135-150).

The plurality of handlers 135-150 log/record activity associated with respective components 105-120. The handlers 135-150 are, for example, log handlers (e.g., extensible plug-ins to Java Utility Logger (JUL) framework), log appliance tailers (LATS) that are a mechanism for obtaining log messages from an operating system, log appenders (e.g., extensible plug-ins to Apache Log 4j framework), or another logging utility that captures log messages. In general, the LATS are standalone utilities that tail or track new log entries of a log file being written by non-Java processes (e.g., system log files of an operating system). In particular, LATS track, capture and structure new log entries to ensure they conform to JUL or Log 4j standards and can be sent to the logging system. In one embodiment, the handlers 135-150 are individual processes or threads that intercept messages produced by components 105-120.

Additionally, the handlers 135-150 are separate from a system logging process of an associated host. For example, consider the component 105 and the associated handler 135. During operation of the component 105 various events (e.g., errors, security threats, conditions, and so on) occur that are to be logged. In one embodiment, when one of these events occurs, the handler 135 intercepts a log message generated by the component 105 and stores the log message in a buffer. Additionally, because the handlers 135-150 are separate from respective components 105-120, when an error or failure occurs in a component, an associated handler remains viable for long enough to collect log messages in one or more buffers. The associated handler subsequently transmits the log messages to the logging appliance 130 while operating independently of the failed component.

In general, a handler may periodically communicate collected log messages in a batch to the logging appliance 130 and/or to the distributed memory 155. In one embodiment, the logging appliance 130 is configured to communicate with the handlers 135-150 to store batches 160 of log messages in the distributed memory 130. The logging appliance 130 communicates with the handlers 135-150 using, for example, an active protocol. That is, the logging appliance 130 and the handlers 135-150 may actively communicate with each other to exchange information such as, configuration information, heartbeat communications, requests, reports and/or log messages (e.g., batches of log messages). Additionally, as used within this disclosure log messages may be referred to as messages, event messages, and/or log messages.

Further details of the handlers 105-120 and the logging appliance 130 will be discussed with reference to FIGS. 2-5 and 6-8, respectively.

Logging Handler

Figure 2:
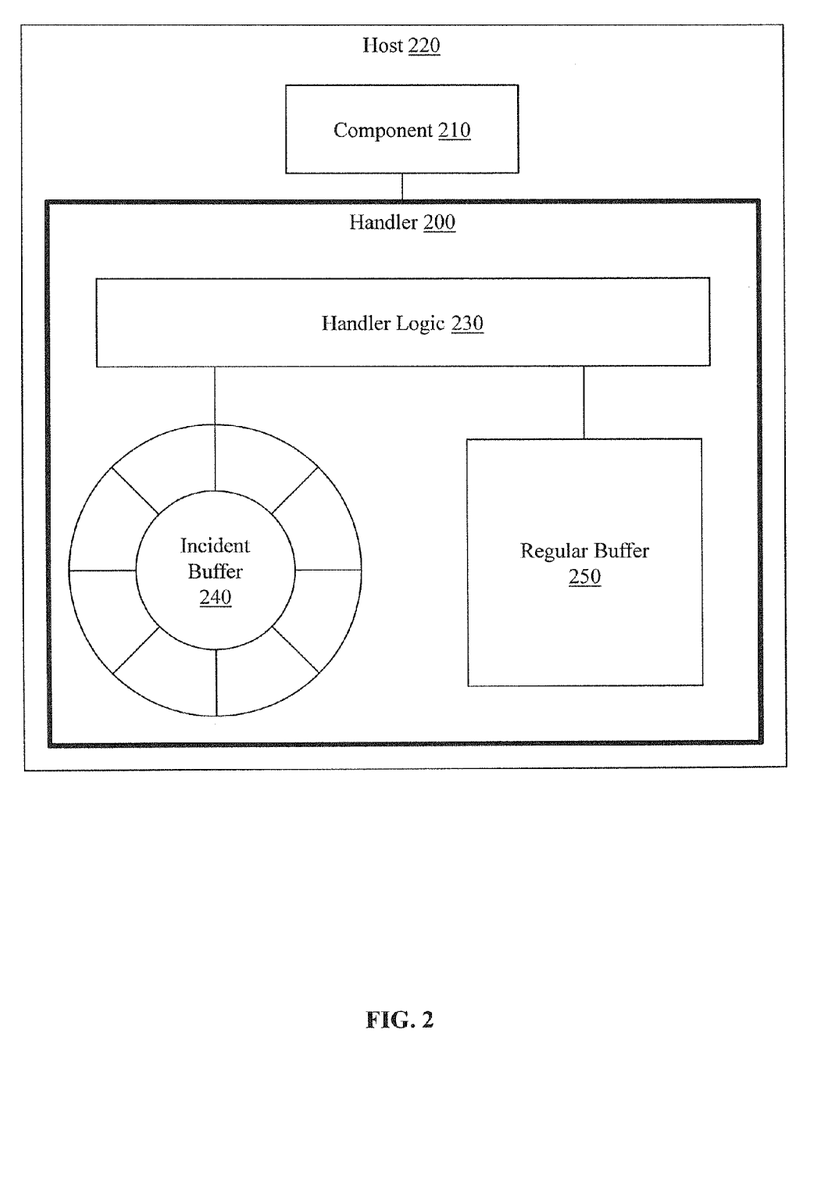
FIG. 2 illustrates one embodiment of a logging handler associated with intelligently gathering log messages.

FIG. 2 illustrates one embodiment of a handler 200 associated with intelligently collecting log messages from a component 210. The handler 200 is representative of the handlers 135-150 as shown in FIG. 1. Accordingly, the handler 200 is associated with a component 210 that is, for example, a process and/or logic executing on a host 220. In general, each handler (e.g., handlers 135-150) collects log messages from one associated component (e.g., components 105-120) and, thus, the handler 200 collects log messages from the component 210. Additionally, as mentioned previously, a host in the application cluster 100 such as the host 220 is, for example, a server or other device on which the component 210 and the handler 200 reside.

As shown in FIG. 2, the handler 200 includes handler logic 230, an incident buffer 240 and a regular buffer 250. In general, the handler logic 230 controls collecting log messages, communicating with the logging appliance 130 of FIG. 1, and storing the log messages in the incident buffer 240 or the regular buffer 250. In one embodiment, the handler 230 collects log messages according to two different levels of granularity (i.e., verbosity levels) and stores the log messages in either the incident buffer 240 or the regular buffer 250 depending on at which level of granularity a log message was collected.

For example, consider that the component 210 generates various log messages in the form of events, messages, alerts, errors, and so on while operating. However, not all of the log messages are immediately relevant or of interest to the logging appliance 130 of FIG. 1 or even the handler 200 itself. Thus, the handler logic 230 is configured to selectively collect a first set of log messages according to a fine granularity and a second set of log messages according to a coarse granularity from the component 210. Consider that collecting log messages at the coarse granularity generally includes, for example, collecting only log messages that are severe errors or other highly important messages (e.g., low resource warnings, security alerts, and so on). In this way, logging messages at a coarse granularity consumes less resources overtime (e.g., less storage since fewer messages are saved).

However, the handler logic 230 is configured to also collect more messages at the fine granularity than at the coarse granularity in order to provide greater detail about what is occurring at the component 210 (e.g., general message about less important events, errors, and so on). However, collecting log messages at the fine granularity results in a greater demand on resources (e.g., storage) if all of the messages are kept.

Therefore, the incident buffer 240 is a circular buffer that is configured to store log messages that are collected according to a fine granularity, but, in general, only a limited number of log messages. That is, the incident buffer 240 is configured to store a predefined number of log messages before overwriting oldest messages with new messages. In this way, the incident buffer 240 recycles slots in the incident buffer 240. Thus, log messages are still collected at a fine granularity without over consuming resources of the host 220 since the buffer is limited in size. Additionally, while a single incident buffer 240 is illustrated in FIG. 2, the handler 200 may include multiple incident buffers (e.g., frozen incident buffer, an active incident buffer, etc.) in various states as will be discussed in greater detail with FIGS. 3-5.

The handler 200 also includes the regular buffer 250 that is configured to store the second set of log messages that are collected according to the coarse granularity. In general, the regular buffer 250 stores log messages without overwriting messages. Instead, the regular buffer 250 is configured to store log messages for a predefined period of time before the handler logic 230 communicates the log messages to the logging appliance 130 in a batch. In this way, contents of the regular buffer 250 are communicated to the logging appliance 130 at a regular interval which in turn frees resources allocated to the regular buffer 250 to store additional log messages.

Furthermore, while the regular buffer 250 and the incident buffer 240 are illustrated as separate elements, in one embodiment, the incident buffer 240 and the regular buffer 250 share a common memory (not shown). The common memory is, for example, a volatile memory of the host 220, such as, a random access memory (RAM) or another memory used for storing/caching log messages.

Figure 3:
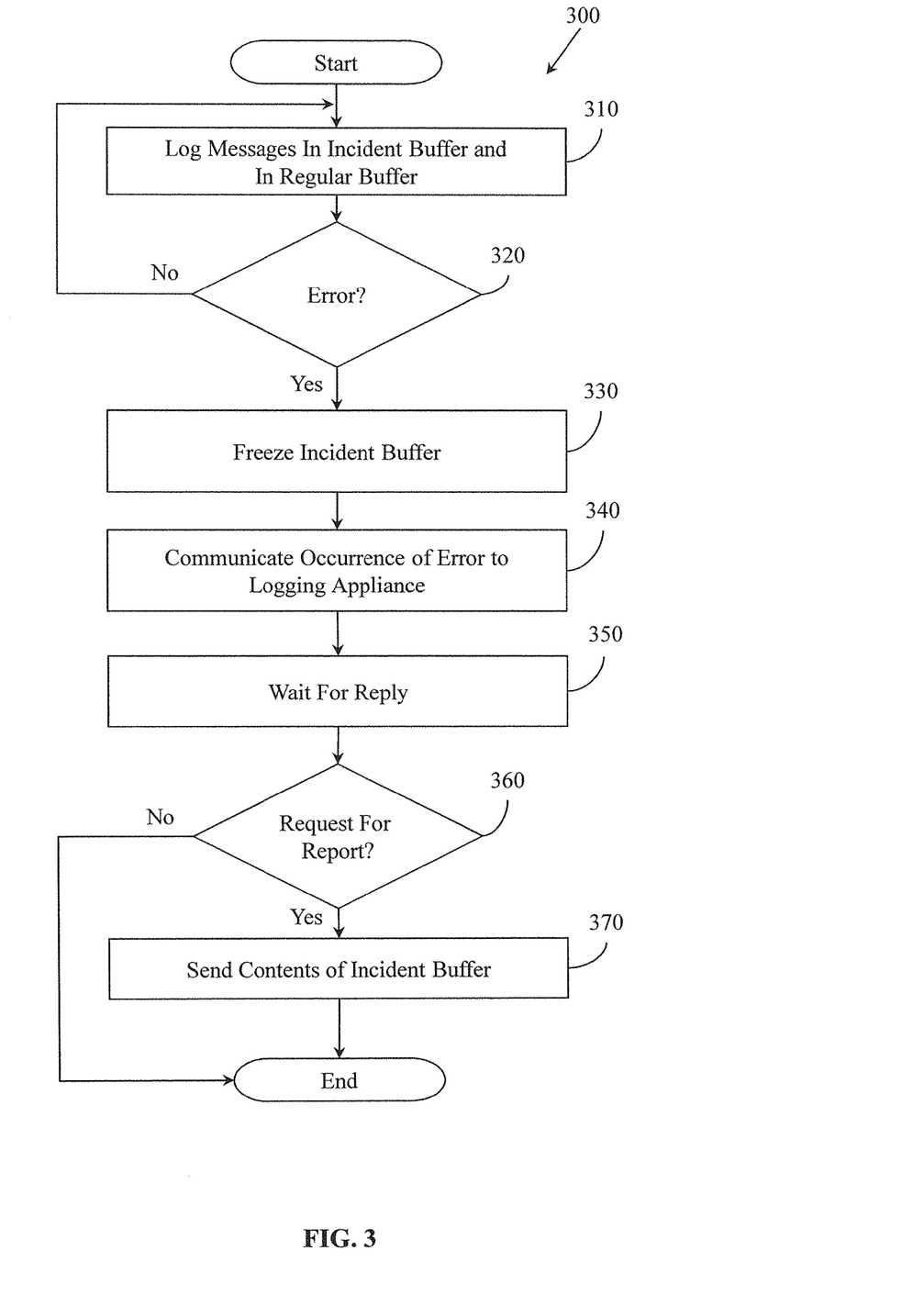
FIG. 3 illustrates one embodiment of a method associated with gathering log messages by a logging handler using incident buffers.

Further details of the handler 200 will be discussed with respect to FIG. 3. FIG. 3 illustrates a method 300 associated with collecting log messages generated by a component in an application cluster. For purposes of this discussion, method 300 will be discussed from the perspective of the handler 200 of FIG. 2. Of course, it should be appreciated that method 300 is not limited to operating within the handler 200, as illustrated in FIG. 2, but is discussed from the perspective of the handler 200 for purposes of simplicity.

At 310, the handler 200 logs messages according to two different levels of granularity. That is, in one embodiment, the handler 200 collects log messages generated by the component 210 according to a fine granularity and a coarse granularity. In general, the handler 200 continuously collects log messages according to the two different levels of granularity at 310 while also checking, at 320, whether any of the messages being collected indicate that an error has occurred at the component 210. In this way, the handler 200 continuously monitors the component 210 for a failure condition or other condition which the handler 200 is to report.

Furthermore, at 310 and 320, while no error is detected, the handler 200 communicates log messages collected according to the coarse granularity that are stored in the regular buffer 250 to the logging appliance 130. That is, the logging handler 200 periodically communicates contents of the regular buffer 250 at a regular interval to the logging appliance 130. In one embodiment, the regular interval is a period of time selected by the logging appliance 130. The period of time for the regular interval is, for example, a regular time at which the handler 200 is to communicate contents of the regular buffer 250 back to logging appliance 130 and reset the regular buffer 250. Accordingly, communications from the handler 200 provided at the regular interval act as heartbeat communications to inform the logging appliance 130 that the handler 200 and the component 210 are still operating and are responsive. In one embodiment, the log handler 200 is configured to communicate an empty batch (i.e., a message without any log messages) at the regular interval if no log messages have been collected in order to maintain the heartbeat.

In one embodiment, logging according to the fine granularity and the coarse granularity are dynamically modifiable. That is, the handler 200, for example, receives configuration information about which log messages are to be included when logging according to the fine and the coarse granularities. Additionally, which errors logged by the handler 200 that constitute a reportable error, at 320, is also configurable. That is, in one embodiment, the logging appliance 130 provides additional configuration information to the handler 200 to set which errors cause the handler to freeze the incident buffer, at 330, and which log messages to collect for fine and coarse logging.

For example, in one embodiment, the handler determines what constitutes an error based, at least in part, on a predefined set of conditions. The predefined set of conditions may include raising an error, at 320, for only severe errors that cause a failure in the component 210. In another embodiment, both warnings and severe errors constitute a reportable error, at 320. In this way, when the handler 200 communicates about errors in the component 210 is configurable by the logging appliance 130. Thus, communications reporting errors, at 320, which are out-of-turn from communications at the regular interval, can be reduced to a specified configuration.

Additionally, in one embodiment, the handler 200 is responsive to a request from the logging appliance 130 to freeze the incident buffer as a result of an error in another component. In this way, the logging appliance 130 can control the handler 200 to preserve information about what was occurring with the component 210 at a time of an error by another handler in the application cluster 100.

Continuing with method 300, if at 320, the handler 200 detects an error in one of the log messages, then the handler 200 proceeds to 330, by freezing the incident buffer 240 in a current state. That is, the handler 200 stops writing log messages according to the fine granularity to the incident buffer 240 and instead preserves log messages in the incident buffer 240 by saving them. In one embodiment, the handler 200 swaps the incident buffer 240 for an active incident buffer (not shown in FIG. 2).

Figure 4:
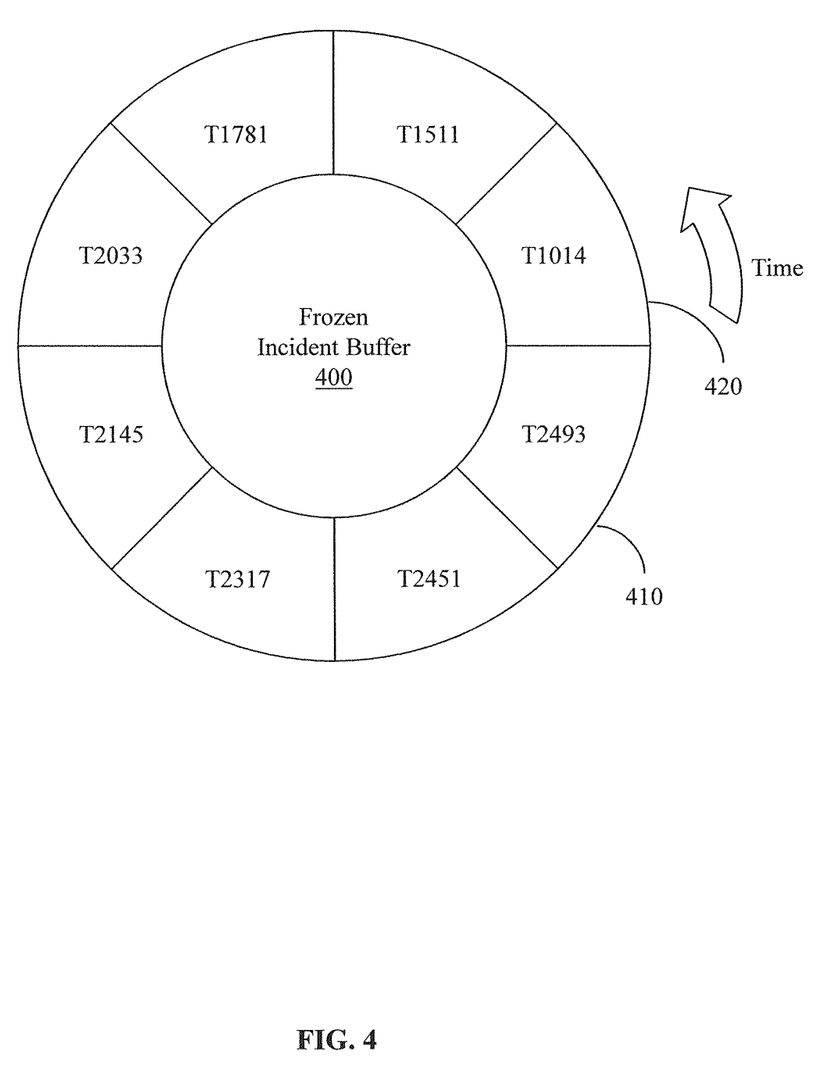
FIG. 4 illustrates one embodiment of an incident buffer associated with a logging handler.

Briefly consider FIGS. 4 and 5, which illustrate an incident buffer 400 and an incident buffer 500. Further consider that the incident buffer 400 represents the incident buffer 240, at 330, when the incident buffer 240 is frozen. The incident buffer 400 is a circular buffer. For example, the incident buffer 400 stores log messages in a limited number of slots.

Accordingly, as the incident buffer 400 receives new log messages, the oldest log messages in the incident buffer 400 are overwritten when the incident buffer 240 is already full. Thus, as illustrated in FIG. 4, the incident buffer 400 is filled in a counter clock-wise direction as messages are received and time progresses. For example, slot 410 presently holds a newest message with a timestamp T2493, while slot 420 holds an oldest message in the incident buffer 400 with a timestamp T1014. Thus, if the incident buffer 400 were not frozen, at 330, then the next slot to be overwritten would be slot 420 that currently stores the log message with the timestamp T1014.

While the incident buffer 400 is illustrated with eight slots, of course, the incident buffer 400 may be configured with a greater or lesser number of slots depending upon a specific implementation. Continuing to FIG. 5, the frozen incident buffer 400 is illustrated along with the active incident buffer 500. In one embodiment, at 330, when the handler 200 freezes the incident buffer 400, a new buffer is instantiated so that logging at the fine granularity can continue.

For example, in FIG. 5, the incident buffer 400 is frozen after a log message is written to slot 410. Fine granularity logging resumes with the active incident buffer 500 after the incident buffer 400 is frozen. This is seen with a log message written to slot 510 that has a timestamp of T2540, which is slightly later than a timestamp of T2493 for the last log message written in incident buffer 400. In this way, log messages that occur proximate to a time of an error can be preserved by freezing and maintaining the incident buffer 400 in a frozen state. Thus, additional information that is of a finer granularity is available for determining a cause of the error without over using resources to save all fine grain log messages continuously.

Continuing with the method 300 and FIG. 3, when the error is detected at 320, the handler 200 proceeds to 330 by freezing the incident buffer. Additionally, the handler 200 also, at 340, communicates contents of the regular buffer 250 to the logging appliance 130. In one embodiment, the handler 200 performs both 330 and 340 in parallel. In this way, the communication is sent to the logging appliance 130 immediately about the error and contents of the incident buffer 240 are preserved so that detailed information about the error is available, if requested.

Additionally, in one embodiment, the communication, at 340, to the logging appliance 130 includes current contents of the regular buffer 250. Thus, the communication is out-of-turn from normal heartbeat communications sent to the handler 200 that include contents of the regular buffer 250. In this way, the logging appliance 130 is provided with a snapshot of information about the error without providing a cumbersome amount of detailed information.

Once the handler 200 provides the communication, at 340, the handler 200 proceeds to wait for a reply from the logging appliance 130, at 350. In one embodiment, the handler 200 waits a predefined amount of time for a reply from the logging appliance before proceeding to 360. In another embodiment, the handler 200 may wait indefinitely for a reply. That is, the handler 200 may wait for a reply indefinitely since the error encountered at 320 by the component 210 was, for example, likely a fatal error that disrupted operation of the component 210 and possibly the entire application cluster 100. Thus, the handler 200 may need to be reset along with the component 210 before returning to operation. In general, the reply from the logging appliance is piggy-backed onto a standard communication between the handler 200 and the logging appliance 130. That is, the reply is, for example, embedded within a communication provided to the handler 200 for a different purpose or a communication that is routinely provided to the handler 200.

At 360, if the handler 200 has received a reply from the logging appliance 130 requesting a report, then the handler 200 communicates log messages from the frozen incident buffer 240 to the logging appliance at 370. If no request is received, then the handler 200 may reset or perform other tasks as instructed by the logging appliance 130. In general, the handler 200 waits at 350 for instructions about whether to send contents of the incident buffer 240 in order to permit the logging appliance 130 to evaluate whether contents of the incident buffer 240 are relevant. In this way, the logging appliance 130 controls which handlers communicate detailed log messages about an error and thus can improve relevancy of information gathered about an error event.

Logging Appliance

Additional aspects of intelligently gathering log messages in the application cluster 100 will be discussed with reference to the logging appliance 130 and FIGS. 6-8.

With reference to FIG. 6, another embodiment of the application cluster 100 of FIG. 1 is shown. For example, FIG. 6 includes all of the same elements from FIG. 1 with additional detail illustrated for the logging appliance 130. Accordingly, the logging appliance 130 includes message logic 610 and incident manager logic 620. In general, the logging appliance 130 is configured to control the plurality of handlers 135-150 to provide log messages to the distributed memory 155 according to two different granularities of logging.

For example, the message logic 610 is configured to receive communications from the plurality of handlers 135-150. As discussed previously in relation to the handler 200, the communications received by the message logic 610 include communications composed of log messages about components associated with the handlers. During a clear operating state when no errors are occurring in the application cluster 100, the communications include batches of log messages gathered according to a coarse granularity as discussed previously.

Since the logging appliance 130 communicates with and controls multiple handlers (i.e., handlers 135-150), many communications are received by the logging appliance 130. For example, during the clear operating state the message logic 610 receives a communication from each of the handlers 135-150 after lapsing of each regular interval/heartbeat. Additionally, while the message logic 610 and the logging appliance 130 are discussed as receiving the communications, of course, in various embodiments, the communications may be received directly by the distributed memory 155 to avoid difficulties with bottlenecks at the logging appliance 130. Thus, the logging appliance 130 may instead receive notification of the communications from the distributed memory 155.

Furthermore, the incident manager logic 620 is configured to analyze the communications to determine whether at least one of the communications indicates an error has been encountered by one of the plurality of components 105-120. That is, the incident manager logic 620 analyzes the communications as they are received to identify communications that indicate an error in a component (e.g., components 105-120). In general, communications indicating errors are atypical in comparison to communications received as heartbeats that are providing batches of log messages from regular buffers. That is, the communications with error messages are generally reported in response to an error and, thus, out-of-turn from communications reported at the regular interval. Additionally, since the error communications are reported out-of-turn they likely include fewer log messages in a batch than is typical.

In either case, the incident manager logic 620 is configured to respond to an error in the application cluster 100 by, for example, directing collection of additional details about the error from sources (e.g., handlers) that are most likely to have relevant information. In this way, the logging appliance 130 narrows a quantity of information collected when errors occur and improves relevancy of information that is collected so that diagnosing causes of the errors is improved.

For example, the incident manager logic 620 is configured to select handlers to provide reports in response to an occurrence of an error. Consider that, each of the handlers 135-150 logs both coarse and fine grain information. Thus, instead of storing excess information from each of the handlers by requesting fine grain information from all handlers, the incident manager logic 620 selects, for example, only handlers that are likely to have information. In one example, the incident manager logic 620 selects handlers that reported errors at a time proximate to the initial error, with relationships to a component that generated the error, and so on.

Consequently, a subset of the plurality of handlers 135-150 are selected to provide reports that include a detailed set of log messages from a time that is proximate to the error. The incident manager logic 620 subsequently uses the reports to generate a summary 630 of the error. The summary 630 uses the detailed log messages from the reports and log messages collected otherwise to provide an analysis of the error. In this way, a succinct analysis of the error is possible without wasting resources by collecting detailed information from all handlers in the application cluster 100.

Further details of intelligently gathering log messages in the application cluster 100 will be discussed in relation to FIG. 7. FIG. 7 illustrates a method 700 associated with coordinating collection of log messages in the application cluster 100. For purposes of simplicity method 700 will be discussed from the perspective of the logging appliance 130. However, it should be appreciated that method 700 is not limited to operating within the logging appliance 130 as illustrated in FIG. 6. Instead, the logging appliance 130 may operate in other configurations in various embodiments that are implementation specific. Additionally, method 700 will be discussed along with state diagram 800 of FIG. 8. The state diagram 800 illustrates various states of the application cluster 100 and conditions for transitioning between the various states.

At 710, the logging appliance 130 receives communications from the plurality of handlers 135-150. In general, the communications include batches of log messages that were collected at a coarse granularity from the plurality of handlers 135-150. Additionally, in one embodiment, the communications are heartbeat communications from the plurality of handlers 135-150. Thus, the communications are received at regular intervals and generally vary minimally from an expected time of arrival.

While the logging appliance 130 is receiving communications, at 710, and analyzing the communications for errors, at 720, the application cluster 100 is, for example, operating in a clear state 805 that is an error free state of the application cluster 100. In one embodiment, the clear state 805 occurs when no severe errors have been reported for a predetermined period of time. The clear state is a steady state of the application cluster 100 that is indicative of a normal operating state when no errors/incidents are occurring. Thus, the clear state 805 is an incident free operating state. In general, the predetermined period of time is an amount of time that satisfies a condition for the application cluster 100 to be operating error free 830.

However, communications may also be received at the logging appliance 130 that are not heartbeat communications. For example, communications are provided to the logging appliance 130 out-of-turn from a typical heartbeat communication in response to an error occurring in one of the components 105-120. Accordingly, the logging appliance 130 analyzes all communications to determine whether at least one of the communications is indicating an error.

In one embodiment, the logging appliance 130 identifies errors according to a set of conditions for triggering further investigation. That is, the set of conditions may specify that the logging appliance 130 is to only proceed with method 700 if, for example, the error is a severe error. In another embodiment, the set of conditions specify multiple conditions, such as, two errors within a certain span of time, a warning and then a severe error, an error when a security threat is set to high, and so on. In either case, the set of conditions are configurable.

Consequently, at 720, when an error is identified in a communication, the logging appliance 130, initiates a transition between a series of states for the application cluster 100 to assess the error. The series of states include, for example, a listening state 810, a scheduling state 815, a closing state 820, a closed state 825 and back to the clear state 805. Thus, once an error condition 835 occurs and is detected, at 720, the logging appliance 130 transitions to a listening state 810.

Accordingly, at 730, during the listening state 810, the logging appliance 130 waits a predefined period of time 840. The logging appliance 130 waits, at 730, to ensure that communications that have relevant information about the error detected at 720 arrive at the logging appliance 130. That is, the logging appliance ensures that any communications that possibly include relevant information have a sufficient amount of time to arrive before taking additional actions. In this way, the logging appliance 130 can, for example, ensure that decisions are made according to a complete record of events presently occurring in the application cluster 100.

For example, waiting during the listening state 810 may permit additional communications to be received that include log messages with timestamps that are prior to the error. Thus, valuable information about a state of the application cluster 100 from just before the error may be gained from log messages in the additional communications. Consequently, the logging appliance 130 can use the information, such as, which components are involved with the error, when the error occurred, what may have caused the error, and so on to better focus selecting, at 740.

Additionally, the predefined period of time 840 is, in one embodiment, an integer multiple of the regular interval at which the plurality of handlers 135-150 provide the heartbeat communications. In this way, the predefined period of time 840 can account for delays and other difficulties in receiving communications before proceeding with method 700.

On expiration 845 of the predefined period of time 840, the logging appliance 130, at 740, enters the scheduling state 815. That is, at 740, the logging appliance 130 selects handlers from the plurality of handlers 135-150 to provide reports 850. In one embodiment, the logging appliance 130 selects handlers that are likely to have information that is relevant to the error. For example, the logging appliance 130 may select handlers that have a relationship to the component that caused the error, handlers associated with components that communicate with the component that generated the error, handlers that reported similar error messages proximate to the error, handlers that have log messages with timestamps proximate to a timestamp of the error, and so on. In general, any linking characteristic that shows a handler has relevant information may contribute to selecting the handler to provide a report.

After selecting the subset of handlers, the logging appliance 130, schedules 855 the subset of handlers to provide reports, at 750. In one embodiment, the logging appliance 130 communicates requests to each handler in the subset to schedule the subset of handlers to provide the reports. For example, the requests include an instruction to provide the report and a time at which to provide the report back to the logging appliance 130.

Additionally, in one embodiment, providing the requests to the subset of handlers causes handlers that have not already frozen an incident buffer to freeze incident buffers. In this way, if a handler that has not encountered an error or has not otherwise been told to freeze the incident buffer, will then freeze the incident buffer in order to preserve log messages that may provide detailed information about the error.

Scheduling the subset of handlers, at 750, causes the logging appliance 130 to transition to the closing state 820. The closing state 820 includes the logging appliance 130 waiting, at 760, a predetermined amount of time 860 to receive the reports from the subset of handlers. In general, the logging appliance 130 waits the predefined amount of time 860, but may also wait additional time to account for delays in receiving the communications. If a report is not received from a handler within the predefined amount of time, then the handler may be considered non-responsive and the logging appliance 130 may continue without reports from non-responsive handlers.

Furthermore, each report is a batch of log messages gathered according to a fine granularity of logging. Thus, the reports provide a detailed set of log messages that are, for example, likely collected by a handler from a time that is proximate to the error. Consequently, information gathered from the reports is likely to be relevant to analyzing the error.

The combination of the reports and the communications are all stored in, for example, the distributed memory 155 of FIGS. 1 and 6. In general, the log messages from the reports and the communications are stored in an unordered state in the distributed memory 155. That is, the log messages from a batch may be dispersed across multiple memories of the distributed memory 155 in no particular order. Thus, after the time expires 865 for the predefined amount of time 860, the logging appliance 130, in one embodiment, collates and sorts the log messages into a formal log. In this way, the logging appliance 130 organizes the log messages to provide an ordered view of what was occurring in the application cluster 100 around a time of the error.

At 770, a summary of the error is generated from at least the reports received from the subset of the plurality of handlers. That is, for example, the logging appliance 130 generates various reports, summaries and so on that simplify viewing information about the error. The summary is generated during the closed state 825 while the logging appliance 130 is waiting to clear a state of the application cluster 100.

If the application cluster 100 does not encounter an error for a predetermined period of time 870 then the logging appliance 130 may proceed back to the clear state 805. Thus, at 780, the error from 720 is cleared from a state of the application cluster 100. Consequently, the application cluster 100 returns to a clear operating state 805. In one embodiment, the logging appliance 130 may reset 875 the plurality of handlers 135-150 to an error free state so that the application cluster 100 may once again operate in the clear state 805 error free.

Computer Embodiment

Figure 9:
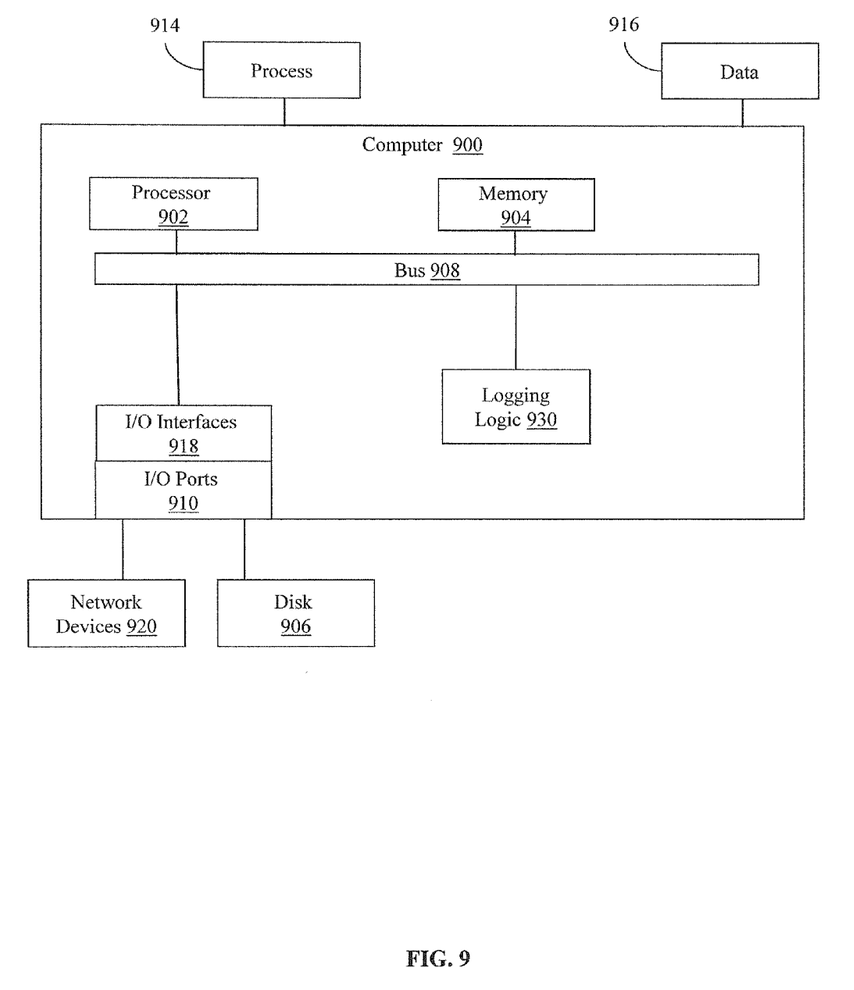
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 may include logging logic 930 configured to facilitate intelligently gathering log messages in an application cluster 100 similar to handler logic 230, message logic 610 and incident manager logic 620 shown in FIGS. 2 and 6, respectively. In different examples, the logic 930 may be implemented in hardware, a non-transitory computer-storage medium with stored instructions, firmware, and/or combinations thereof. While the logic 930 is illustrated as a hardware component attached to the bus 908, it is to be appreciated that in one example, the logic 930 could be implemented in the processor 902.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer-storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-storage medium", as used herein, is a non-transitory medium that stores instructions and/or data. A computer-storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

What is claimed is:

1. A non-transitory computer-storage medium storing instructions for processing log messages from a component that is part of an application cluster and that when executed by one or more processors cause the one or more processors to at least:
    collect log messages generated by the component according to a fine granularity and a coarse granularity, wherein the instructions to collect the log messages according to the fine granularity include instructions to store a first set of messages from the log messages in an incident buffer of a logging handler,
    wherein the instructions to collect the log messages according to the coarse granularity include instructions to store a second set of messages from the log messages in a regular buffer, and
    wherein the second set of log messages includes fewer log messages than the first set of log messages; and
    in response to detecting an error at the component, (i) freeze the incident buffer to preserve the first set of log messages present in the incident buffer, and (ii) communicate the second set of log messages in the regular buffer to a logging appliance,
    wherein the instructions to store the first set of messages in the incident buffer write a new log message by overwriting an oldest log message that has been stored longer than other log messages of the first set of messages,
    wherein the instructions to store the second set of messages store the second set of messages for a defined period of time and do not overwrite messages in the regular buffer when writing a new log message, and
    wherein the instructions to collect the log messages according to the fine granularity include instructions to collect log messages according to the coarse granularity and collect additional messages that are not collected for the coarse granularity.

2. The non-transitory computer-storage medium of claim 1, further comprising:
    instructions to communicate the second set of messages in a batch to the logging appliance at a regular interval and as a heartbeat communication when no error has occurred.

3. The non-transitory computer-storage medium of claim 1, further comprising:
    instructions to, after freezing the incident buffer when an error is detected:
    (i) swap the incident buffer for an active incident buffer by storing new log messages of the first set of messages in the active incident buffer to preserve log messages already stored in the incident buffer that is frozen, and
    (ii) maintain the incident buffer in a frozen state until instructed by the logging appliance.

4. The non-transitory computer-storage medium of claim 1, further comprising:
    instructions to send the first set of log messages that are frozen in the incident buffer to the logging appliance upon receiving a request for a report from the logging appliance.

5. The non-transitory computer-storage medium of claim 1, further comprising:

instructions to freeze log messages in the incident buffer when no error has occurred at the component in response to a request from the logging appliance.

6. The non-transitory computer-storage medium of claim 1, wherein the instructions to detect the error include instructions to detect the error based, at least in part, on a predefined set of conditions that are dynamically configurable according to control messages received from the logging appliance.

7. A computer-implemented logging handler for processing log messages from a component that is located at a host in an application cluster, the logging handler comprising:
   an incident buffer configured to store a first set of log messages, wherein the incident buffer stores a predefined number of log messages before overwriting oldest messages with new messages;
   a regular buffer configured to store a second set of log messages, wherein the regular buffer stores log messages for a predefined period of time;
   a handler logic configured to collect log messages generated by the component according to a fine granularity and a coarse granularity, wherein the handler logic is configured to (i) store log messages collected according to the fine granularity in the incident buffer and (ii) store log message collected according to the coarse granularity in the regular buffer, wherein the handler logic is configured to collect fewer log messages for the coarse granularity of logging than the fine granularity of logging, and
   wherein the handler logic is configured to, in response to detecting an error message at the component, (i) freeze the incident buffer to preserve log messages present in the incident buffer, and (ii) communicate the second set of log messages to a logging appliance.

8. The logging handler of claim 7, wherein the error is a fault condition within the component, and wherein the handler logic is configured to collect the log messages according to the fine granularity by collecting log messages that are collected for the coarse granularity and additional messages that are not collected for the coarse granularity.

9. The logging handler of claim 7, wherein the handler logic is configured to communicate the second set of messages in a batch to the logging appliance at a regular interval and as a heartbeat communication when no error has occurred.

10. The logging handler of claim 7, wherein the handler logic is configured to, after freezing the incident buffer when an error is detected,
   (i) swap the incident buffer for an active incident buffer by storing new log messages of the first set of messages in the active incident buffer to preserve log messages already stored in the incident buffer that is frozen, and
   (ii) maintain the incident buffer in a frozen state until instructed by the logging appliance.

11. The logging handler of claim 7, wherein the handler logic is configured to send the first set of log messages that are frozen in the incident buffer to the logging appliance upon receiving a request for a report from the logging appliance.

12. The logging handler of claim 7, wherein the handler logic is configured to freeze log messages in the incident buffer when no error has occurred at the component in response to a request from the logging appliance.

13. The logging handler of claim 7, wherein the log handler is configured to detect the error message based, at least in part, on a predefined set of conditions that are dynamically configurable according to control messages received from the logging appliance.

14. The logging handler of claim 7, wherein the logging handler is one of, a Java Utility Logger (JUL) and a Log 4j handler, and wherein the logging handler is one of a plurality of logging handlers in the application cluster that provide log messages to the logging appliance about a plurality of components.

15. A computer-implemented method, comprising:
   collecting, by a logging handler associated with a component, log messages according to two different granularities for logging messages, wherein the two different granularities include a fine granularity and a coarse granularity, wherein collecting the log messages according to the fine granularity includes storing log messages in an incident buffer; and
   in response to detecting an error at the component, (i) freezing the incident buffer to preserve log messages present in the incident buffer, and (ii) communicating log messages that are collected according to the coarse granularity from a regular buffer to a logging appliance, wherein the log messages are stored for a defined period of time,
   wherein collecting the log messages includes storing log messages in the incident buffer by overwriting an oldest log message that has been stored longer than other log messages of the first set of messages with a new log message, wherein collecting the log messages according to the fine granularity includes collecting additional log messages that are not collected according to the coarse granularity.

16. The computer-implemented method of claim 15, wherein a limited number of messages are stored in the incident buffer.

17. The computer-implemented method of claim 15, further comprising:
   communicating log messages stored in the regular buffer to the logging appliance at a regular interval, wherein log messages collected according to the coarse granularity are stored in the regular buffer, wherein communicating log messages at the regular interval is a heartbeat communication to the logging appliance to inform the logging appliance that the logging handler continues to operate, and
   wherein communicating the log messages in response to detecting the error occurs out of turn from the regular interval.

18. The computer-implemented method of claim 15, wherein freezing the incident buffer includes swapping the incident buffer for an active incident buffer by storing new log messages in the active incident buffer to preserve log messages already stored in the incident buffer that is frozen.

19. The computer-implemented method of claim 15, further comprising:
   communicating log messages in the frozen incident buffer to the logging appliance in response to a request by the logging appliance to provide a report about the error.

* * * * *